US012132167B2

United States Patent
Zhu et al.

(10) Patent No.: US 12,132,167 B2
(45) Date of Patent: Oct. 29, 2024

(54) MULTI-PHASE ELECTROLYTE FILM AND METHOD OF MAKING THE SAME

(71) Applicants: Samsung Electronics Co., Ltd., Suwon-si (KR); Massachusetts Institute of Technology, Cambridge, MA (US)

(72) Inventors: Yuntong Zhu, Cambridge, MA (US); Jesse Hinricher, Pipestone, MN (US); Zachary Hood, Bolingbrook, IL (US); Lincoln Miara, Lincoln, MA (US); Heung Chan Lee, Gyeonggi-do (KR); Won Seok Chang, Seoul (KR); Jennifer Rupp, Cambridge, MA (US)

(73) Assignees: SAMSUNG ELECTRONICS CO., LTD., Gyeonggi-do (KR); MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 0 days.

(21) Appl. No.: 17/365,441

(22) Filed: Jul. 1, 2021

(65) Prior Publication Data
US 2022/0344702 A1 Oct. 27, 2022

Related U.S. Application Data

(60) Provisional application No. 63/180,150, filed on Apr. 27, 2021.

(51) Int. Cl.
*H01M 10/0562* (2010.01)

(52) U.S. Cl.
CPC .......... *H01M 10/0562* (2013.01); *H01M 2300/0071* (2013.01); *H01M 2300/008* (2013.01)

(58) Field of Classification Search
CPC ..... H01M 10/0562; H01M 2300/0071; H01M 2300/008
See application file for complete search history.

(56) References Cited

U.S. PATENT DOCUMENTS

| | | |
|---|---|---|
| 9,070,930 B2 | 6/2015 | Seo et al. |
| 9,112,236 B2 | 8/2015 | Miyagi et al. |
| 10,665,842 B2 | 5/2020 | Wong et al. |
| 10,818,963 B2 | 10/2020 | Makino et al. |
| 10,854,930 B2 | 12/2020 | Sakamoto et al. |
| 2014/0087261 A1 | 3/2014 | Li et al. |

(Continued)

OTHER PUBLICATIONS

Wang et al., "L:ithium Ion Conducting Poly9ethylene oxide)-Based Solid Electrolytes Containing Active or Passive Ceramic Nanoparticles", The Journal of Physical Chemistry, vol. 121, 2017; pp. 2563-2573.

*Primary Examiner* — Brian R Ohara
*Assistant Examiner* — Patrick Marshall Greene
(74) *Attorney, Agent, or Firm* — CANTOR COLBURN LLP

(57) ABSTRACT

A multi-phase electrolyte film includes a first phase comprising a metal oxide, wherein the metal oxide is amorphous, crystalline, or a glass; and a second phase comprising a lithium salt having a decomposition temperature in air of greater than 200° C. or a lithium halide. The first phase is dispersed in the second phase and has an average particle size of 5 to 200 nanometers. Methods for the manufacture of the electrolyte film are also disclosed.

6 Claims, 6 Drawing Sheets

(56) References Cited

U.S. PATENT DOCUMENTS

| | | | |
|---|---|---|---|
| 2015/0180001 A1* | 6/2015 | Johnson | C01G 25/006 |
| | | | 429/246 |
| 2017/0170515 A1 | 6/2017 | Yushin et al. | |
| 2020/0058940 A1* | 2/2020 | Kim | H01M 10/058 |
| 2020/0144607 A1* | 5/2020 | Yang | H01M 10/0566 |
| 2020/0303707 A1* | 9/2020 | Zhou | H01M 50/426 |
| 2020/0321662 A1* | 10/2020 | Johnson | H01M 10/0563 |
| 2020/0403269 A1 | 12/2020 | Zhu et al. | |
| 2021/0102063 A1 | 4/2021 | Lin et al. | |
| 2022/0123359 A1* | 4/2022 | Platt | C01B 25/14 |
| 2023/0275222 A1* | 8/2023 | Jordy | H01M 10/0562 |
| | | | 429/231.95 |

* cited by examiner

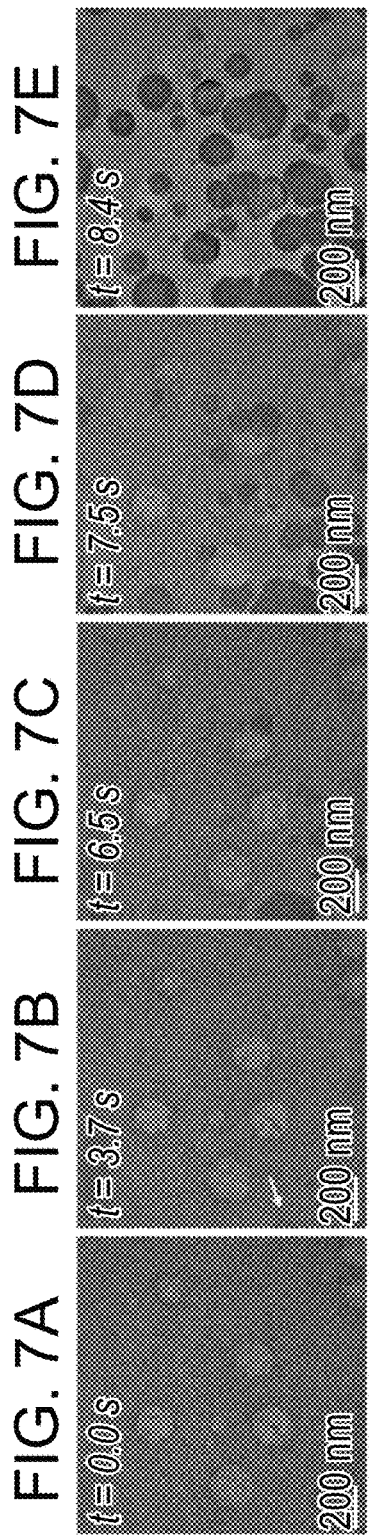
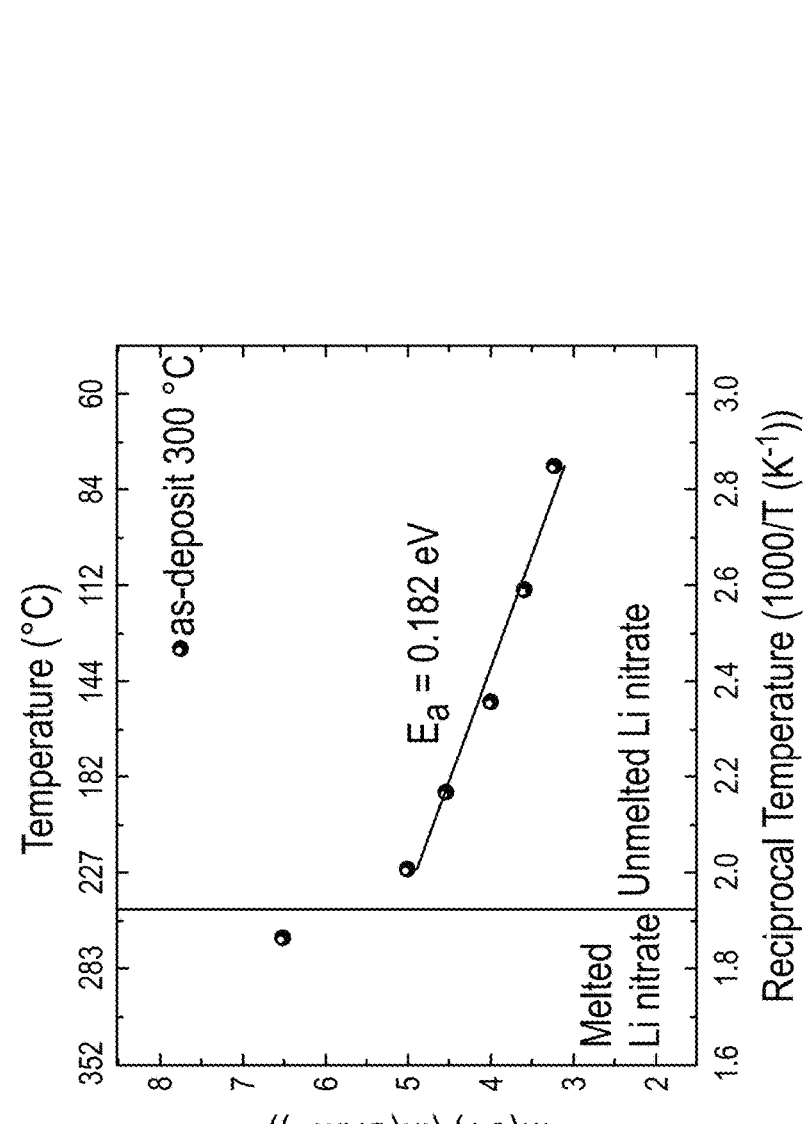
FIG. 7A  FIG. 7B  FIG. 7C  FIG. 7D  FIG. 7E
FIG. 8

US 12,132,167 B2

MULTI-PHASE ELECTROLYTE FILM AND METHOD OF MAKING THE SAME

CROSS-REFERENCE TO RELATED APPLICATION

This application claims priority to U.S. Provisional Patent Application No. 63/180,150, filed on Apr. 27, 2021, in the United States Patent and Trademark Office, and all the benefits accruing therefrom under 35 U.S.C. § 119, the content of which is incorporated herein in its entirety by reference.

FIELD

Disclosed is a multi-phase electrolyte film. Also disclosed are methods for the manufacture of the multi-phase electrolyte film and solid state electrochemical cells including the multi-phase electrolyte film.

BACKGROUND

Lithium batteries are of interest because they can potentially offer improved specific energy and energy density, improved safety, and in some configurations, improved power density. There has been increased focus on using lithium metal as a negative electrode to improve the energy density of solid-state lithium batteries. However, the lithium conductivity of available solid-state electrolytes is significantly less than liquid alternatives, and those that have high ionic conductivity (e.g., greater than 1 millisiemens per centimeter) are not suitably stable in the presence of lithium metal. In addition, to provide improved safety, a material which provides improved stability to air would be desirable.

There remains a need for improved solid-state electrolytes for high energy density solid-state batteries.

SUMMARY

Disclosed is a multi-phase electrolyte film, a method for manufacturing the same, and an electrochemical cell comprising the multi-phase electrolyte film.

In an aspect, a multi-phase electrolyte comprises a first phase comprising a metal oxide, wherein the oxide is amorphous, crystalline, or a glass; and a second phase comprising a lithium salt having a decomposition temperature in air of greater than 200° C. or a lithium halide; wherein the second phase is dispersed in the first phase and has an average particle size of 5 to 200 nanometers.

In an aspect, a method for producing a multi-phase electrolyte film comprises providing a mixture comprising a lithium source, and one or more metal oxide precursors; spraying the mixture onto a solid substrate at a temperature of 150 to 500° C. to provide the multi-phase electrolyte film comprising a first phase comprising a metal oxide, wherein the oxide is amorphous, crystalline, or a glass, and a second phase comprising a lithium salt having a decomposition temperature in air of greater than 200° C. or a lithium halide, wherein the second phase is dispersed in the first phase and has an average particle size of 5 to 200 nanometers.

In an aspect, an electrochemical cell comprises a positive electrode; a negative electrode; and an electrolyte layer between the positive electrode and the negative electrode, wherein at least one of the positive electrode, the negative electrode, or the electrolyte layer comprises the multi-phase electrolyte film.

The above described and other features are exemplified by the following figures and detailed description.

BRIEF DESCRIPTION OF THE DRAWINGS

The following figures are exemplary aspects wherein the like elements are numbered alike.

FIG. 7A shows the results of in-situ high resolution transmission electron microscopy (HR-TEM) analysis of melting and infiltration of $LiNO_3$ into Al, La, and Zr oxides at 275° C. at an isothermal holding time of 0.0 seconds (s).

FIG. 7B shows the results of in situ high resolution transmission electron microscopy (HR-TEM) analysis of melting and infiltration of $LiNO_3$ into Al, La, and Zr oxides at 275° C. at an isothermal holding time of 3.7 seconds (s).

FIG. 7C shows the results of in situ high resolution transmission electron microscopy (HR-TEM) analysis of melting and infiltration of $LiNO_3$ into Al, La, and Zr oxides at 275° C. at an isothermal holding time of 6.5 seconds (s).

FIG. 7D shows the results of in situ high resolution transmission electron microscopy (HR-TEM) analysis of melting and infiltration of $LiNO_3$ into Al, La, and Zr oxides at 275° C. at an isothermal holding time of 7.5 seconds (s).

FIG. 7E shows the results of in situ high resolution transmission electron microscopy (HR-TEM) analysis of melting and infiltration of $LiNO_3$ into Al, La, and Zr oxides at 275° C. at an isothermal holding time of 8.4 seconds (s).

FIG. 8 is a graph of the natural log of conductivity*temperature ($ln(\sigma T)$, reported in units of $ln(SKm^{-1})$) versus temperature (° C., upper scale) or reciprocal temperature (1000/Kelvin (K), lower scale) and shows the results of Arrhenius analysis of the as-deposited film with Li-ion conductivity measured at 78° C., 113° C., 151° C., 188° C., 225° C., and 263° C.

DETAILED DESCRIPTION

Figure 1:
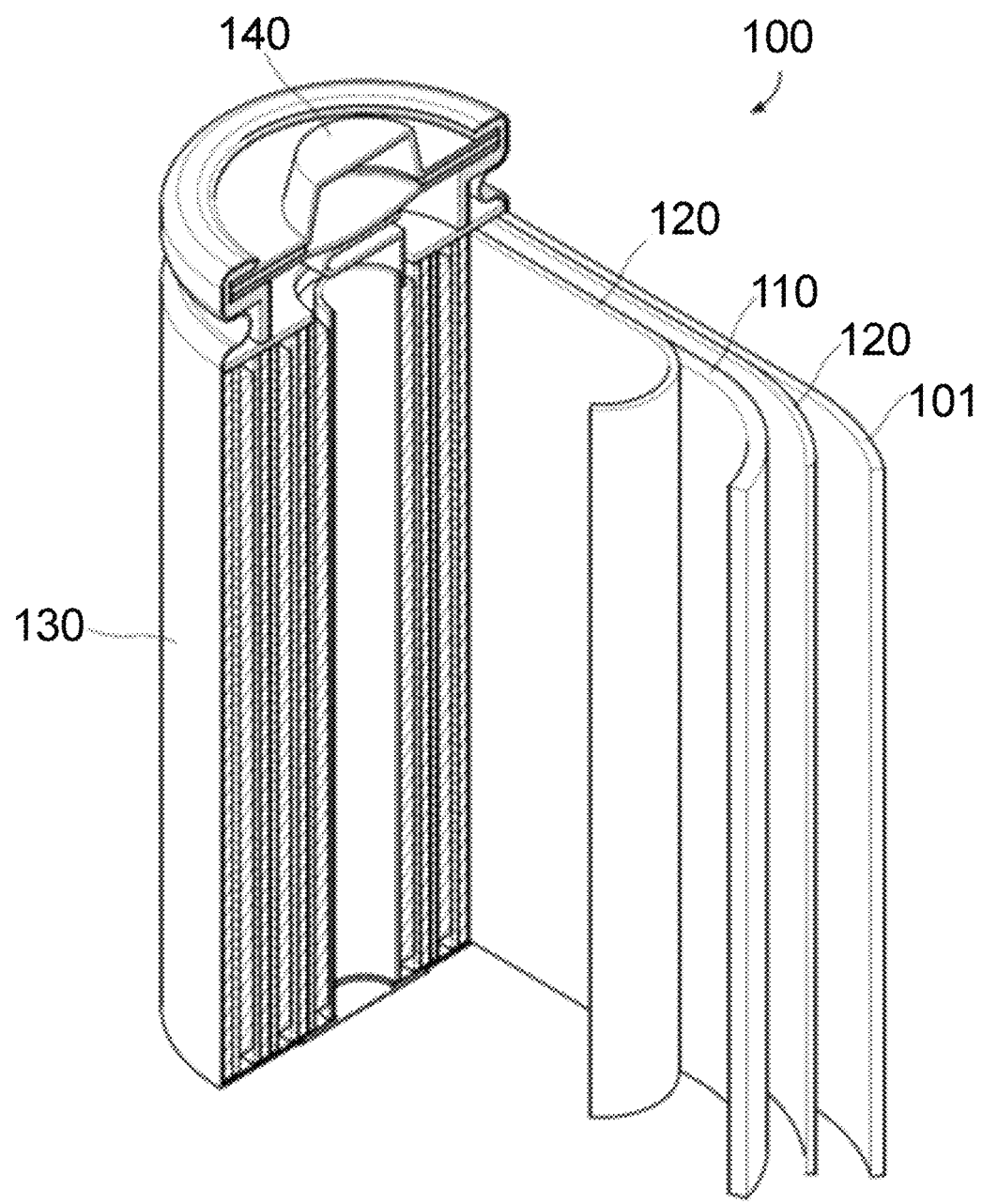
FIG. 1 is a schematic diagram of an aspect of a lithium battery.

Currently available lithium-ion batteries face several technical limitations which restrict their application in high energy density batteries for portable electronics, electric propulsion, and grid-scale energy storage.

Research efforts to date have focused on pairing Li metal anodes with high voltage cathodes for "beyond Li-ion" batteries, favoring solid-state electrolytes due to their wide electrochemical stability window and improved safety. In an example, lithium phosphorous oxynitride (LIPON) is an amorphous glass that has demonstrated columbic efficiencies above 99.9% for 10,000 cycles without Li-dendrite formation. However, the low lithium conductivity of LIPON ($10^{-8}$-$10^{-6}$ siemens per centimeter (S/cm) at room temperature) results in low charging rates (e.g., 0.1C). Alternatively, ceramic oxide-based materials, such as garnet-type $Li_7La_3Zr_2O_{12}$ (LLZO) have been explored as alternatives for UPON due to their higher ionic conductivity ($10^4$ S/cm at room temperature). However, production of ceramic solid electrolytes includes one or more annealing or sintering steps at high temperatures (e.g., greater than 700° C.) to achieve the desired high conduction phase, which limits their processability in a commercial setting.

Disclosed is a multi-phase electrolyte film having a desirable combination of properties. The multi-phase electrolyte film can be deposited by a one-step spray pyrolysis process, which can address the aforementioned limitations of known ceramic electrolytes. The present inventors have unexpectedly found that a multi-phase electrolyte film comprising a first phase comprising a metal oxide and a second phase comprising a particular lithium salt can provide promising lithium-ion conductivity. Without wishing to be bound by theory, it is believed that the lithium salt phase can provide a 3-dimensional interconnected lithium conduction pathway, while the oxide phase can provide structural support, encapsulating the lithium salt in the film. The interface between the lithium salt phase and the metal oxide phase is further believed to promote lithium conduction through the introduction of defects in the lithium salt phase.

The multi-phase electrolyte films can have high room temperature conductivity of $10^{-4}$ S/cm, and can be processed at significantly lower temperature (e.g., 300° C.) than alternative solid-state electrolytes. During the preparation of the disclosed multi-phase electrolyte film, temperatures above 500° C. are avoided. The films of the present disclosure can be provided by wet-chemical-based spray pyrolysis at a temperature of 150 to 500° C., for example 200 to 400° C., or 300° C., and without additional heat treatment steps. Thus, the processing temperature of the disclosed lithium solid electrolyte film is significantly reduced. Comparatively, the manufacture of garnet ceramic lithium-conductive films includes an annealing step, often at a temperature above 700° C. (e.g., for a wet-chemical prepared garnet-type cubic phase $Li_7La_3Zr_2O_{12}$ film).

In another advantageous feature, selection of the lithium salt and the metal oxide in the disclosed multi-phase electrolyte film can be varied, to accommodate manufacturing preferences or preferred material properties.

The disclosed multi-phase solid electrolyte provides high lithium-ion conductivity and reduced processing temperature, and thus can compete favorably with alternative materials such as LIPON, and therefore represents the next generation electrolyte film for high energy density solid-state batteries.

Accordingly, an aspect of the present disclosure is a multi-phase electrolyte film. As used herein, the term "multi-phase" refers to a material comprising at least two compounds that are phase separated. The separate phases can be observed by scanning electron microscopy (SEM) or transmission electron microscopy (TEM) and are distinct from a substitutional or interstitial solid solution. In an aspect disclosed further below, a two-phase material is disclosed in which a lithium salt is dispersed in a metal oxide.

The multi-phase electrolyte comprises a first phase comprising a metal oxide. The metal oxide can be amorphous, crystalline, or a glass. In an aspect, the first phase can comprise an amorphous metal oxide. The metal oxide can comprise, for example, one or more of La, Zr, Hf, Si, Ti, Ca, Mg, Y, Ta, Al, Ce, Ta, Ga, Nd, or Dy. In an aspect, the metal oxide can comprise one or more of La, Zr, Ta, or Al. In a specific aspect, the metal oxide can be an amorphous oxide comprising La, Zr, and Al. Amorphous, as used herein, means that the metal oxide has less than 15 weight percent (wt %) crystalline content, e.g., 0.01 to 10 wt %, or 0.1 to 5 wt %, based on a total weight of the metal oxide, when determined by X-ray powder diffraction analysis. Alternatively or additionally, an amorphous metal oxide exhibits no crystalline metal oxide peaks when analyzed by Raman spectroscopy.

The multi-phase electrolyte film further comprises a second phase comprising a lithium salt. The second phase is dispersed in the first phase. Thus, the first phase comprising the metal oxide can also be referred to as a "host phase" and the second phase comprising the lithium salt can also be referred to as a "guest phase." The lithium salt of the second phase can be amorphous or crystalline. The second phase, e.g., the lithium salt-containing phase, can have an average particle size or crystallite size of 5 to 200 nm. Within this range, the average particle size can be at least 10 nm, or at least 20 nm, or at least 50 nm, or at least 100 nm. Also within this range, the average particle size can be at most 150 nm, or at most 100 nm, or at most 75 nm, or at most 50 nm. The average particle size of the second phase can be determined, for example, using X-ray powder diffraction (XRD), e.g., by Scherrer analysis, or using imaging techniques such as transmission electron microscopy (TEM). Without wishing to be bound by theory, it is believed that the lithium salt dispersed in the metal oxide phase contributes to the improved conductivity of the resulting multi-phase electrolyte film. For example, defects in the lithium salt phase arising from the interface of the lithium salt phase and the metal oxide phase can contribute to the improved conductivity.

The lithium salt of the second phase can have a decomposition temperature in air of greater than 400° C. and may comprise a lithium halide. In an aspect, the lithium salt has a decomposition temperature of greater than 200° C., or greater than 300° C., or greater than 400° C., or greater than 450° C., or greater than 500° C. (e.g., at standard pressure, in air). In an aspect, the lithium salt has a decomposition temperature of less than 800° C., 700° C., 600° C., 500° C., or 400° C. The lithium salt may have a decomposition temperature between any suitable combination of the foregoing upper and lower bounds. The lithium salt may be selected such that significant decomposition will not occur at the processing temperature used to form the multi-phase film. For example, lithium salts having a decomposition temperature of less than 400° C., or less than 300° C., or less than 200° C. can decompose during processing to form a low conductivity crystalline phase. Careful selection of the lithium salt having a particular decomposition temperature can therefore provide the multi-phase electrolyte films by minimizing or avoiding thermal decomposition during processing. In an aspect, a lithium salt having a decomposition temperature of less than 400° C. is selected to increase the amorphous content, which may provide improved lithium conductivity.

In an aspect, the lithium salt of the second phase can be derived from a lithium source which has at least partially decomposed. Stated another way, a lithium source useful for preparing the multi-phase film of the present disclosure may have a decomposition temperature which is less than 400° C., or less than 300° C., or less than 200° C., provided that when the lithium source is subjected to wet-chemical-based spray pyrolysis at a temperature of 150 to 500° C., the decomposition product is a lithium salt having a decomposition temperature of greater than 200° C., or greater than 300° C., or greater than 400° C. For example, lithium azide ($LiN_3$) may be used as a lithium source and the resulting lithium salt of the second phase may comprise a $LiN_3$ decomposition product, for example $Li_3N$. Also, residual (undecomposed) $LiN_3$ may remain.

The lithium salt of the second phase can include, for example, $LiNO_3$, $Li_3N$, $Li_2SO_4$, $Li_3PO_4$, LiF, LiCl, LiBr, LiOH, $LiClO_4$, $LiN_3$, or a combination thereof. In an aspect, the lithium salt can comprise $LiNO_3$, $LiN_3$, or $Li_3N$.

In an aspect, the first phase comprises an amorphous metal oxide of La, Zr, and Al, and the second phase comprises $LiNO_3$, $LiN_3$, or $Li_3N$. In an aspect, the first phase can comprise an amorphous metal oxide of La, Zr and Al, and the second phase can comprise $LiNO_3$, $LiN_3$, or $Li_3N$, and the second phase can have an average particle size of 20 to 100 nm.

The multi-phase electrolyte film can have improved room temperature lithium conductivity. In an aspect, the multi-phase electrolyte film can have a lithium conductivity of greater than 0.1 millisiemens per centimeter (mS/cm) at 30° C. For example, the multi-phase electrolyte film can have a lithium conductivity of greater than 0.1 to 0.5 mS/cm, or greater than 0.1 to 0.4 mS/cm, or 0.15 to 0.35 mS/cm, or 0.2 to 0.3 mS/cm, each at 30° C. Ionic conductivity may be determined by a complex impedance method at 20° C., further details of which can be found in J.-M. Winand et al., "Measurement of Ionic Conductivity in Solid Electrolytes," Europhysics Letters, vol. 8, no. 5, p. 447-452, 1989, the content of which is incorporated herein by reference in its entirety. In an aspect, the multi-phase electrolyte film can have an activation energy of less than 0.25 electron volts (eV).

In a specific aspect, the first phase can comprise an amorphous oxide of La, Zr, and Al, the second phase comprise $LiNO_3$ having an average crystallite size of 20 to 100 nm, and the multi-phase electrolyte film can have a lithium conductivity of greater than 0.1 to 0.5 mS/cm at 30° C. and an activation energy of 0.1 to 0.2 eV.

In an aspect, the multi-phase electrolyte film can be a dual-phase film consisting of the first phase and the second phase. In an aspect, the multi-phase electrolyte film can optionally further comprise a third phase. When present, the third phase can comprise a lithium salt that is different from the lithium salt of the second phase. In an aspect, the third phase can comprise a lithium oxide. In an aspect, a lithium salt different from the lithium salt of the second phase and a lithium oxide can be present in the third phase.

The multi-phase electrolyte film can be disposed on a substrate. The substrate can be solid or porous. For example, the substrate can comprise a borosilicate, carbon, a polyimide, a metal, a metal alloy, or a metal oxide. Also the substrate can have any suitable form, and can be in the form of a solid film, a woven material, or a nonwoven material.

The multi-phase electrolyte film can have a thickness of 1 to 50 micrometers (μm). Within this range, the thickness can be 1 to 30 μm, or 1 to 20 μm, or 1 to 15 μm, or 1 to 10 μm, or 1 to 8 μm, or 2 to 8 μm, or 1 to 5 μm.

The multi-phase electrolyte film of the present disclosure can be produced by a method comprising heating a substrate, providing a mixture comprising a lithium source, one or more metal oxide precursors and a solvent, and contacting the heated substrate with the mixture to provide the multi-phase electrolyte film. The multi-phase electrolyte films of the present disclosure are "as-deposited." "As-deposited" as used herein refers to the films as they are deposited onto the substrate, with no additional processing steps. Stated another way, the multi-phase films of the present disclosure are not necessarily subjected to any annealing or other heat treatments subsequent to deposition on the substrate.

Any suitable substrate may be used. For example, as described above, exemplary substrates can include a borosilicate, carbon, a polyimide, a metal, a metal alloy, or a metal oxide. In an aspect, the substrate comprises a metal oxide. In an aspect, the substrate can be, for example, at least one of yttrium stabilized zirconia, aluminum oxide, anodized aluminum oxide, magnesium oxide, or a silicon oxide of the formula $SiO_x$ wherein $0 \leq x \leq 2$. The substrate can optionally be porous. For example, the substrate can have an average pore diameter of 1 to 50 nanometers (nm), or 5 to 45 nm, or 10 to 40 nm, or 15 to 35 nm, or 20 to 30 nm. In an aspect, the substrate can have an average pore diameter of 1 to 50 micrometers (μm), or 1 to 30 μm, or 1 to 25 μm, or 1 to 15 μm, or 1 to 10 μm.

Heating the substrate can be to a temperature of 150 to 500° C. In an aspect, the substrate can be heated during the contacting step. Heating the substrate can be to a temperature of 150 to 450° C., or 250 to 500° C., or 250 to 450° C., or 250 to 400° C., or 250 to 350° C., or 275 to 325° C., or 300 to 350° C.

In an aspect, the mixture can be provided using a single precursor mixture comprising a lithium source and the one or more metal oxide precursors. The lithium source can be, for example, $LiNO_3$, $LiN_3$, $Li_2SO_4$, $Li_3PO_4$, LiF, LiCl, LiBr, LiOH, $LiClO_4$, or a combination thereof. In an aspect, the lithium source can comprise $LiNO_3$, $LiN_3$, or a combination thereof. Suitable metal oxide precursors can include, for example, a metal oxide, hydroxide, nitrate, azide, carbonate, oxalate, peroxide, acetate, acetylacetonate, or a combination thereof. In an aspect, the metal oxide precursor can comprise a lanthanum precursor, an aluminum precursor, and a zirconium precursor, wherein each of the lanthanum precursor, the aluminum precursor, and the zirconium precursor can independently be an oxide, hydroxide, nitrate, azide, carbonate, oxalate, peroxide, acetate, or acetylacetonate.

Alternatively, the mixture can be provided by contacting a first precursor mixture and a second precursor mixture. The first precursor mixture can comprise a metal oxide precursor, for example lanthanum oxide precursor, an aluminum oxide precursor, a zirconium oxide precursor, and a first solvent. Each of the lanthanum oxide precursor, the aluminum oxide precursor, and the zirconium oxide precursor can independently be an oxide, hydroxide, nitrate, azide, carbonate, oxalate, peroxide, acetate, or acetylacetonate. The second precursor mixture can comprise a lithium source and a second solvent, wherein the second solvent is the same or different than the first solvent. The lithium source can be, for example, $LiNO_3$, $LiN_3$, $Li_2SO_4$, $Li_3PO_4$, LiF, LiCl, LiBr, LiOH, $LiClO_4$, or a combination thereof. In an aspect, the lithium source can comprise $LiNO_3$, $LiN_3$, or a combination thereof.

Representative metal oxide precursor compounds comprising lanthanum include lanthanum oxide, lanthanum hydroxide, lanthanum nitrate, lanthanum carbonate, lanthanum oxalate, lanthanum peroxide, lanthanum acetate, or lanthanum acetoacetate.

Representative metal oxide precursor compounds comprising zirconium include zirconium oxide, zirconium hydroxide, zirconium nitrate, zirconium carbonate, zirconium oxalate, zirconium peroxide, zirconium acetate, zirconium acetoacetate, or zirconium oxynitride.

Representative metal oxide precursor compounds comprising aluminum include aluminum oxide, aluminum hydroxide, aluminum nitrate, aluminum carbonate, aluminum oxalate, aluminum peroxide, aluminum acetate, or aluminum acetoacetate.

The mixture for forming the multi-phase electrolyte film can be a solution or a suspension comprising the lithium source and the one or more metal oxide precursors in the solvent. In an aspect, the mixture is a solution of the lithium source and the precursor compounds in the solvent. Use of a suspension is also mentioned.

The solvent may comprise a substituted or unsubstituted $C_{1-20}$ alcohol, a substituted or unsubstituted $C_{1-40}$ ester, a substituted or unsubstituted $C_{2-20}$ carbonate, a substituted or unsubstituted $C_{1-20}$ ketone, water, or a combination thereof. Use of a substituted or unsubstituted alcohol, a substituted or unsubstituted ester, a substituted or unsubstituted carbonate, a substituted or unsubstituted ketone, or a combination thereof is mentioned. In an aspect, the solvent comprises a substituted or unsubstituted $C_{1-10}$ alcohol and an ester. In an aspect, the first solvent is an unsubstituted alcohol, the second solvent is a substituted alcohol, and the third solvent is a substituted or unsubstituted carbonate, a substituted or unsubstituted ester, or a substituted or unsubstituted ketone. Use of methanol, a substituted propanol, and a substituted phthalate, are mentioned. In an embodiment, the solvent can be methanol, a substituted propanol, e.g., 1-methoxy-2-propanol, a phthalate, such as bis(2-ethylhexyl) phthalate, or a combination thereof.

The solvent can have a boiling point of 0 to 150° C., or 5 to 125° C., or 10 to 100° C., or 20 to 80° C. In an aspect, the solvent has a boiling point of 20 to 90° C.

A content of each solvent may be independently selected. For example, when the solvent comprises an alcohol and a phthalate, a content of the alcohol may be 1 to 99 volume percent (vol %), 5 to 95 vol %, 10 to 90 vol %, 20 to 80 vol %, or 30 to 70 vol %, 40 to 60 vol %, or 45 to 55 vol %, and a content of the phthalate may be 99 to 1 vol %, 95 to 5 vol %, 90 to 10 vol %, 80 to 20 vol %, 70 to 30 vol %, 60 to 40 vol %, or 55 to 45 vol %, based on at total volume of the solvents. In an aspect in which a plurality of alcohols are used, a content of each alcohol may be independently selected, and each alcohol may be contained in an amount of e.g., 1 to 99 vol %, 5 to 95 vol %, 10 to 90 vol %, 20 to 80 vol %, or 30 to 70 vol %, based on at total volume of the alcohols. In an aspect, a first solvent, a second solvent, and third solvent may be used. A content of the first solvent, the second solvent, and the third solvent may be independently selected, and each may be contained in an amount of 1 to 99 vol %, 5 to 95 vol %, 10 to 90 vol %, 20 to 80 vol %, 30 to 70 vol %, 40 to 60 vol %, or 45 to 55 vol %, based on a total volume of the solvent. In an aspect, a content of the first solvent, a content of the second solvent, and a content of the third solvent are each independently 1 to 50 vol %, 2 to 45 vol %, 5 to 40 vol %, or 10 to 35 vol %, based on a total volume of the solvents.

The concentrations of each of the lithium source and the metal oxide precursors in the solvent can be a concentration which is suitable for spray pyrolysis. In an aspect, the concentration of the precursor compounds can be 0.001 to 1 molar (M), 0.005 to 0.5 M, 0.01 to 0.1 M, or 0.02 to 0.08 M.

The contacting step comprises using spray pyrolysis of the mixture to form the multi-phase electrolyte film on the surface of the substrate. In an aspect, a heat-treating step (e.g., annealing) of the multi-phase electrolyte film following the spray pyrolysis step is omitted. For example, the present method excludes an annealing step, for example at a temperature of 300 to 1200° C. The multi-phase electrolyte film is in "as-deposited" form and is therefore advantageously provided in a single step.

The disclosed method provides a solid-state, multi-phase electrolyte film having a desirable thickness, ionic conductivity, and stability against lithium metal. The disclosed method can also provide a cost-effective method of making the multi-phase electrolyte film.

Also disclosed is an electrochemical cell (e.g., a lithium battery) comprising the multi-phase electrolyte film in at least one of a positive electrode, a negative electrode, or a separator. It is understood that the positive electrode could alternatively be referred to as a cathode, and the negative electrode as an anode.

A schematic diagram of an electrochemical cell is provided in FIG. 1. As shown in FIG. 1, a negative electrode 101 can be used in combination with a positive electrode 110 and an electrolyte layer 120 can be provided between the positive electrode and the negative electrode. The electrochemical cell of FIG. 1 may comprise the multi-phase electrolyte film of the present disclosure. The negative electrode 101, the positive electrode 110, or an electrolyte layer 120 can each independently comprise the multi-phase electrolyte film of the present disclosure. Mentioned is the use of a negative electrode 101 having the multi-phase electrolyte film disposed thereon.

Figure 2:
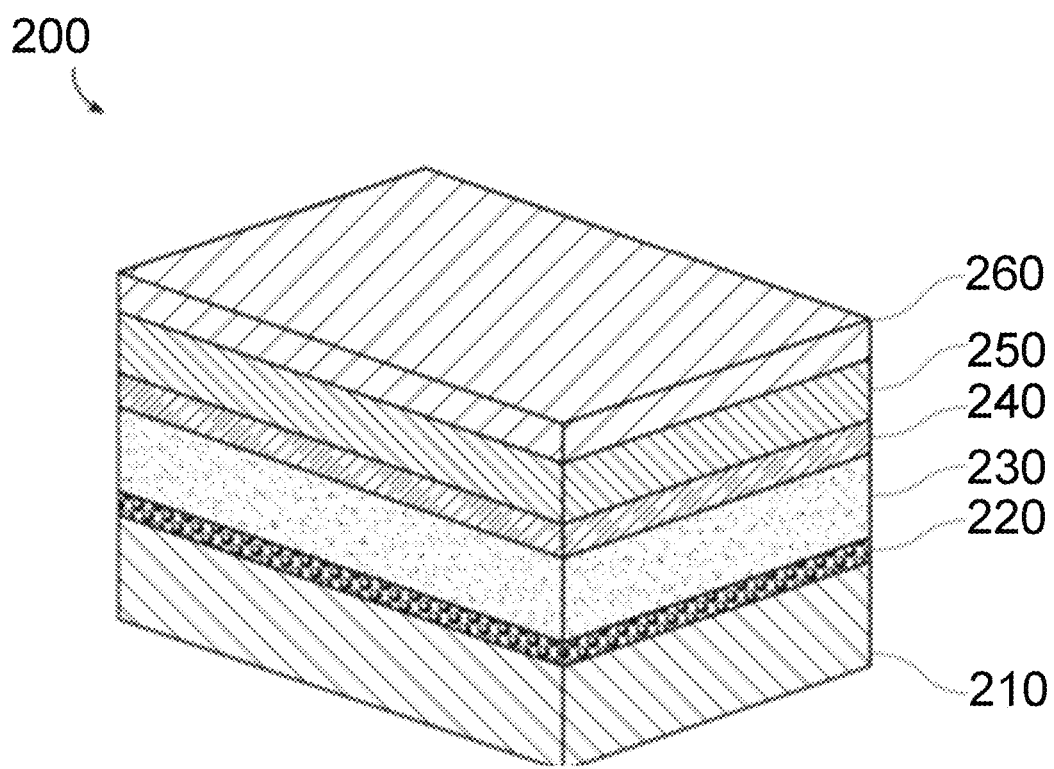
FIG. 2 is a schematic diagram of an aspect of a lithium battery.

In an aspect, the multi-phase electrolyte layer can be useful as a negative active material protection layer. The negative active material protection layer, when present, can be disposed on the negative electrode and adjacent to a solid electrolyte. For example, as shown in FIG. 2, a battery 200 may comprise a solid-electrolyte 230 adjacent to a negative active material protection layer 240 comprising the multi-phase electrolyte film. Also shown in FIG. 2 is a positive electrode current collector 210, a positive electrode 220 comprising a positive electrode active material, a negative electrode 250, and a negative electrode current collector 260.

The positive electrode can be prepared by forming a positive active material layer including a positive active material on a current collector. The current collector may comprise aluminum, for example.

The positive active material can comprise a lithium transition metal oxide, a lithium transition metal sulfide. For example, the positive active material can include a composite oxide of lithium and a metal selected from cobalt, manganese, and nickel. For example, the positive active material can be a compound represented by any of the Formulas: $Li_aA_{1-b}M_bD_2$ wherein $0.90 \leq a \leq 1.8$ and $0 \leq b \leq 0.5$; $Li_aE_{1-b}M_bO_{2-c}D_c$ wherein $0.90 \leq a \leq 1.8$, $0 \leq b \leq 0.5$, and $0 \leq c \leq 0.05$; $LiE_{2-b}M_bO_{4-c}D_c$ wherein $0 \leq b \leq 0.5$ and $0 \leq c \leq 0.05$;

$Li_aNi_{1-b-c}Co_bM_cD_a$ wherein $0.90 \leq a \leq 1.8$, $0 \leq b \leq 0.5$, $0 \leq c \leq 0.05$, and $0 \leq \alpha \leq 2$; $Li_aNi_{1-b-c}Co_bM_cO_{2-\alpha}X_\alpha$ wherein $0.90 \leq a \leq 1.8$, $0 \leq b \leq 0.5$, $0 \leq c \leq 0.05$, and $0 < \alpha < 2$; $LiaNi_{1-b-c}Co_bM_cO_{2-\alpha}X_2$ wherein $0.90 \leq a \leq 1.8$, $0 \leq b \leq 0.5$, $0 \leq c \leq 0.05$, and $0 < \alpha < 2$; $Li_aNi_{1-b-c}Mn_bM_cD_a$ wherein $0.90 \leq a \leq 1.8$, $0 \leq b \leq 0.5$, $0 \leq c \leq 0.05$, and $0 < \alpha < 2$; $Li_aNi_{1-b-c}Mn_bM_cO_{2-\alpha}X_\alpha$ wherein $0.90 \leq a \leq 1.8$, $0 \leq b \leq 0.5$, $0 \leq c \leq 0.05$, and $0 < \alpha < 2$; $Li_aNi_{1-b-c}Mn_bM_cO_{2-\alpha}X_2$ wherein $0.90 \leq a \leq 1.8$, $0 \leq b \leq 0.5$, $0 \leq c \leq 0.05$, and $0 < \alpha < 2$; $Li_aNi_bE_cG_dO_2$ wherein $0.90 \leq a \leq 1.8$, $0 \leq b \leq 0.9$, $0 \leq c \leq 0.5$, and $0.001 \leq d \leq 0.1$; $Li_aNi_bCo_cMn_dGeO_2$ wherein $0.90 \leq a \leq 1.8$, $0 \leq b \leq 0.9$, $0 \leq c \leq 0.5$, $0 \leq d \leq 0.5$, and $0.001 \leq e \leq 0.1$; $Li_aNiG_bO_2$ wherein $0.90 \leq a \leq 1.8$ and $0.001 \leq b \leq 0.1$; $Li_aCoG_bO_2$ wherein $0.90 \leq a \leq 1.8$ and $0.001 \leq b \leq 0.1$; $Li_aMnG_bO_2$ where $0.90 \leq a \leq 1.8$ and $0.001 \leq b \leq 0.1$; $Li_aMn_2GbO_4$ wherein $0.90 \leq a \leq 1.8$ and $0.001 \leq b \leq 0.1$; $QO_2$; $QS_2$; $LiQS_2$; $V_2O_5$; $LiV_2O_2$; $LiRO_2$; $LiNiVO_4$; $Li_{(3-f)}(PO_4)_3$ ($0 \leq f \leq 2$); $Li_{(3-f)}Fe_2(PO_4)_3$ wherein $0 \leq f \leq 2$; and $LiFePO_4$, in which in the foregoing positive active materials A is Ni, Co, or Mn; M is Al, Ni, Co, Mn, Cr, Fe, Mg, Sr, V, or a rare-earth element; D is O, F, S, or P; E is Co or Mn; X is F, S, or P; G is Al, Cr, Mn, Fe, Mg, La, Ce, Sr, or V; Q is Ti, Mo or Mn; R is Cr, V, Fe, Sc, or Y; and J is V, Cr, Mn, Co, Ni, or Cu. Examples of the positive active material include $LiCoO_2$, $LiMn_xO_{2x}$ where x is 1 or 2, $LiNi_{1-x}Mn_xO_{2x}$ where $0 \leq x \leq 1$, $LiNi_{1-x-y}Co_xMn_yO_2$ where $0 \leq x \leq 0.5$ and $0 \leq y \leq 0.5$, $LiFePO_4$, $TiS_2$, $FeS_2$, $TiS_3$, and $FeS_3$. For example, the positive active material can include a composite oxide of lithium and a metal selected from cobalt, manganese, and nickel. Mentioned are NMC 811 ($LiNi_{0.8}Mn_{0.1}Co_{0.102}$), NMC 622 ($LiNi_{0.6}Mn_{0.2}Co_{0.2}O_2$), NMC 532 ($LiNi_{0.5}Mn_{0.3}Co_{0.2}O_2$), and NCA ($LiNi_{0.8}Co_{0.15}Al_{0.05}O_2$). The positive active material is not limited to the foregoing and any suitable positive active material can be used.

The positive active material can optionally further include a conductive agent and a binder. Any suitable conductive agent or binder can be used.

A binder can facilitate adherence between components of the electrode, such as the positive active material and the conductor, and adherence of the electrode to a current collector. Examples of the binder can include at least one of polyacrylic acid (PAA), polyvinylidene fluoride, polyvinyl alcohol, carboxymethyl cellulose (CMC), starch, hydroxypropyl cellulose, regenerated cellulose, polyvinylpyrrolidone, tetrafluoroethylene, polyethylene, polypropylene, ethylene-propylene-diene monomer (EPDM), sulfonated EPDM, styrene-butadiene-rubber, fluorinated rubber, or a copolymer thereof. The amount of the binder can be in a range of about 1 part by weight to about 10 parts by weight, for example, in a range of about 2 parts by weight to about 7 parts by weight, based on a total weight of the positive active material. When the amount of the binder is in the range above, e.g., about 1 part by weight to about 10 parts by weight, the adherence of the electrode to the current collector may be suitably strong. Any suitable binder may be used.

The conductive agent can include, for example, carbon black, carbon fiber, graphite, carbon nanotubes, graphene, or a combination thereof. The carbon black can be, for example, acetylene black, Ketjen black, Super P carbon, channel black, furnace black, lamp black, or thermal black. The graphite can be a natural graphite or an artificial graphite. A combination comprising at least one of the foregoing conductive agents can be used. The positive electrode can additionally include an additional conductor other than the carbonaceous conductor described above. The additional conductor can be an electrically conductive fiber, such as a metal fiber; a metal powder such as a fluorinated carbon powder, an aluminum powder, or a nickel powder; a conductive whisker such as a zinc oxide or a potassium titanate; or a polyphenylene derivative. A combination comprising at least one of the foregoing additional conductors can be used. Any suitable conductive agent can be used.

The positive active material layer can be prepared by screen printing, slurry casting, or powder compression. However the method is not limited thereto, and any suitable method may be used.

The negative electrode can be produced from a negative active material composition including a negative active material, and optionally, a conductive agent and a binder. A suitable negative active material includes a material capable of storing and releasing lithium ions electrochemically. The negative electrode active material can comprise lithium metal or a lithium metal alloy. Also usable is a carbon, such as a hard carbon, soft carbon, carbon black, Ketjen black, acetylene black, activated carbon, carbon nanotubes, carbon fiber, graphite, or an amorphous carbon. Also usable are lithium-containing metals and alloys, for example a lithium alloy comprising Si, Sn, Sb, Ge, or a combination thereof. Lithium-containing metal oxides, metal nitrides, and metal sulfides are also useful, in particular wherein the metal can be at least one of Ti, Mo, Sn, Fe, Sb, Co, or V. Also useable are phosphorous (P) or metal doped phosphorous (e.g., $NiP_3$). The negative active material is not limited to the foregoing and any suitable negative active material can be used. In an aspect the negative active material is disposed on a current collector, such as copper current collector. In an aspect, the negative electrode comprises graphite. In an aspect, the negative electrode comprises lithium metal or a lithium metal alloy. Use of lithium metal is mentioned.

As is disclosed above, the disclosed multi-phase electrolyte film can be provided between the positive electrode and the negative electrode, and may be contained in the positive electrode, the negative electrode, or a combination thereof, e.g., as a protection layer. In an aspect, the multi-phase electrolyte film is directly on the negative electrode. In an aspect, the multi-phase electrolyte film can be disposed between the positive and negative electrodes and can serve as a solid electrolyte. In an aspect, the multi-phase electrolyte film can serve as a separator to electrically insulate the positive electrode from the negative electrode. In an aspect, the multi-phase electrolyte film can be disposed on a substrate to provide a separator in an electrochemical cell. Suitable substrates can include, for example, polymer such as nylon, polyester, polyethylene, polypropylene, poly(tetrafluoroethylene), or polyvinyl chloride, a ceramic such as $TiO_2$ or yttria stabilized zirconia, or a glass such as a borosilicate glass. A combination comprising at least one of the foregoing may be used. Also, the substrate may have any suitable form, and may be nonwoven or woven material, or in the form of a film, e.g., a microporous film. Use of microporous polyethylene, microporous polypropylene, or a composite thereof is mentioned.

The electrochemical cell can include a solid electrolyte, for example, an inorganic solid electrolyte. The solid electrolyte in the solid electrolyte layer may be, for example, at least one of an oxide-containing solid electrolyte or a sulfide-containing solid electrolyte.

Examples of the oxide-containing solid electrolyte may include at least one of $Li_{1+x+y}Al_xTi_{2-x}Si_yP_{3-y}O_{12}$ (where $0 \leq x < 2$ and $0 \leq y < 3$), $BaTiO_3$, $Pb(Zr_aTi_{1-a})O_3$ (PZT) (where $0 \leq a \leq 1$), $Pb_{1-x}La_xZr_{1-y}Ti_yO_3$ (PLZT) (where $0 \leq x < 1$ and $0 \leq y < 1$), $Pb(Mg_{1/3}Nb_{2/3})O_3$-$PbTiO_3$ (PMN-PT), $HfO_2$, $SrTiO_3$, $SnO_2$, $CeO_2$, $Na_2O$, $MgO$, $NiO$, $CaO$, $BaO$, $ZnO$, $ZrO_2$, $Y_2O_3$, $Al_2O_3$, $TiO_2$, $SiO_2$, $Li_3PO_4$, $Li_xTi_y(PO_4)_3$ (where $0<x<2$ and $0<y<3$), $Li_xAl_yTi_z(PO_4)_3$ (where $0<x<2$, $0<y<1$, and $0<z<3$), $Li_{1+x+y}(Al_aGa_{1-a})_x(Ti_bGe_{1-b})_{2-x}Si_yP_{3-y}O_{12}$ (where $0\leq x\leq 1$, $0\leq y\leq 1$, $0\leq a\leq 1$, and $0\leq b\leq 1$), $Li_xLa_yTiO_3$ (where $0<x<2$ and $0<y<3$), $Li_2O$, $LiOH$, $Li_2CO_3$, $LiAlO_2$, $Li_2O^-Al_2O_3$—$SiO_2$—$P_2O_5$—$TiO_2$—$GeO_2$, or $Li_{3+x}La_3M_2O_{12}$ (where M is Te, Nb, or Zr, and $0\leq x\leq 10$). Also mentioned is $Li_7La_3Zr_2O_{12}$ (LLZO) or $Li_{3+x}La_3Zr_{2-a}M_aO_{12}$ (M-doped LLZO, where M is Ga, W, Nb, Ta, or Al, and $0\leq x\leq 10$ and $0\leq a<2$).

In an aspect, the solid electrolyte may be a sulfide-containing solid electrolyte. Examples of the sulfide-containing solid electrolyte may include at least one of $Li_2S$—$P_2S_5$, $Li_2S$—$P_2S_5$—LiX (where X is a halogen element), $Li_2S$—$P_2S_5$—$Li_2O$, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—$Z_mS_n$ (where m and n each are a positive number, Z represents any of Ge, Zn, and Ga), $Li_2S$—$GeS_2$, $Li_2S$—$SiS_2$—$Li_3PO_4$, $Li_2S$—$SiS_2$-$Li_pMO_q$ (where p and q each are a positive number, M represents at least one of P, Si, Ge, B, Al, Ga, or In), $Li_{7-x}PS_{6-x}Cl_x$ (where $0\leq x\leq 2$), $Li_{7-x}PS_{6-x}Br_x$ (where $0\leq x\leq 2$), or $Li_{7-x}PS_{6-x}I_x$ (where $0\leq x\leq 2$).

Also, the sulfide-containing solid electrolyte may include at least sulfur (S), phosphorus (P), and lithium (Li), as component elements among the sulfide-containing solid electrolyte materials. For example, the sulfide-containing solid electrolyte may be a material including $Li_2S$—$P_2S_5$. Here, when the material including $Li_2S$—$P_2S_5$ is used as a sulfide-containing solid electrolyte material, a mixing molar ratio of $Li_2S$ and $P_2S_5$ ($Li_2S:P_2S_5$) may be, for example, selected in a range of about 50:50 to about 90:10.

For example, the sulfide-containing solid electrolyte may include an argyrodite-type solid electrolyte represented by Formula 2:

$$Li^+{}_{12-n-x}A_n{}^+Q_{2-6-x}X^{-x} \quad \text{Formula 2}$$

In Formula 2, A is at least one of P, As, Ge, Ga, Sb, Si, $S_n$, Al, In, Ti, V, Nb, or Ta, Q is at least one of S, Se, or Te, X is at least one of Cl, Br, I, F, CN, OCN, SCN, or $N_3$, $1\leq n\leq 5$, and $0\leq x\leq 2$.

The sulfide-containing solid electrolyte may be an argyrodite-type compound including at least one of $Li_{7-x}PS_{6-x}Cl_x$ (where $0\leq x\leq 2$), $Li_{7-x}PS_{6-x}Br_x$ (where $0\leq x\leq 2$), or $Li_{7-x}PS_{6-x}I_x$ (where $0\leq x\leq 2$). Particularly, the sulfide-containing solid electrolyte in the solid electrolyte layer may be an argyrodite-type compound including at least one of $Li_6PS_5Cl$, $Li_6PS_5Br$, or $Li_6PS_5I$.

The solid electrolyte may be prepared by a sintering method, by melting and quenching starting materials (e.g., $Li_2S$ or $P_2S_5$), or by mechanical milling. The solid electrolyte may be amorphous or crystalline. A mixture may be used.

The solid electrolyte layer may, for example, include a binder. Examples of the binder in the solid electrolyte layer may include styrene butadiene rubber (SBR), polytetrafluoroethylene, polyvinylidene fluoride, or polyethylene, but aspects are not limited thereto, and any suitable binder may be used. The binder of the solid electrolyte may be the same as or different from a binder of the cathode active material layer and the first anode active material layer.

The solid electrolyte comprising the oxide-containing solid electrolyte or the sulfide-containing solid electrolyte may be further included in the positive active material layer, if desired.

In some aspects, other electrolytes, such as a liquid electrolyte can be excluded from the electrochemical cell of the present disclosure.

The electrochemical cell can be manufactured by providing a positive electrode, providing a negative electrode, and disposing the multi-phase electrolyte film between the positive electrode and the negative electrode. The method can optionally further comprise disposing a separator between the positive and the negative electrodes. For example, the electrochemical cell can be manufactured by sequentially laminating the negative electrode, the multi-phase electrolyte film, and the positive electrode; winding or folding the laminated structures then enclosing the would or folded structure in a cylindrical or rectangular battery case or pouch to provide the electrochemical cell.

This disclosure is further illustrated by the following examples, which are non-limiting.

Examples

All chemicals for the following examples were used as received without further purification. Lithium nitrate ($LiNO_3$) ($\geq 99\%$), zirconium(IV) acetylacetonate (97%), lithium azide ($LiN_3$) solution 20 wt. % in water and 1-methoxy-2-propanol (>99.5%) were purchased from Sigma-Aldrich. $Al(NO_3)_3 \cdot 9H_2O$, $La(NO_3)_3 \cdot 6H_2O$ (99.99%), and bis(2-ethylhexyl) phthalate were purchased from Alfa Aesar. Methanol was purchased from VWR. Polished MgO (100) substrates (10×10×0.5 mm) were purchased from MTI Corporation. Glass fiber substrates (0.7 μm thickness) were purchased from Lab Safety Supply.

Synthesis of Spray Solutions

In Example 1, spray solutions were prepared with precursor salts of $LiNO_3$, Zirconium(IV) acetylacetonate, $Al(NO_3)_3 \cdot 9H_2O$, and $La(NO_3)_3 \cdot 6H_2O$. The precursor salts were dissolved with stoichiometric ratio of Li:La:Al:Zr=11:3:0.25:2 in a methanol:1-methoxy-2-propanol:bis(2-ethylhexyl) phthalate (33:33:33 vol %) solution. The concentration of the prepared spray solution was 0.11 M (in terms of $LiNO_3$).

In Example 2, two spray solutions were prepared. In the first solution, lithium azide solution 20 wt % in water was diluted in a methanol:1-methoxy-2-propanol:diethylene monobutyl ether (33:33:33 vol %) solution. The concentration of the first solution (containing Li precursor) was 0.22 M (in terms of Li salt). In the second solution, Zirconium (IV) acetylacetonate, $Al(NO_3)_3 \cdot 9H_2O$, and $La(NO_3)_3 \cdot 6H_2O$ were dissolved with stoichiometric ratio of La:Al:Zr=3:0.25:2 in a methanol:1-methoxy-2-propanol:bis(2-ethylhexyl) phthalate (33:33:33 vol %) solution. The concentration of the second solution (containing La, Zr, and Al precursors) was 0.06 M (in terms of La salt).

The prepared spray solutions were stirred overnight for at least 12 hours.

Procedure for Spraying Multi-Phase Composite Thin Film Electrolytes

Spray solutions were loaded into a polypropylene syringe and pumped at 5-10 milliliters per hour (mL/hour) into a spray gun (DeVILBLISS, AG361). The spray gun used compressed air as the carrier gas with a pressure at the atomizer of 0.3 bar. MgO substrates were placed on a heated stainless steel plate (on the surface of the hot plate). The substrate temperature was kept at 300° C., and the distance between the substrates and the atomizer was set to 24 centimeters (cm). The spray pyrolysis was carried out for deposition of 5-20 milliliters (mL) solution during each deposition.

Characterization

Scanning electron microscopy (SEM) images were collected on a Zeiss Supra55VP field emission scanning electron microscope operated between 3.0-10.0 kV using In-lens SE detector. Samples were cross sectioned with a diamond blade and were attached to a specialized sample stage via carbon-conductive tape.

Raman spectroscopy was completed on a WiTec with a spectral resolution of 0.7 $cm^{-1}$ at 10 mW and a wavelength of 532 nm to ensure low penetration depths.

Differential scanning calorimetry (DSC) and thermogravimetric analysis (TGA) were carried out with a Mettler Toledo DSC/TGA system at ramp rates of 10° C./minute from room temperature to 800° C. MgO crucibles were used to prevent interdiffusion and reaction between crucibles and Li salts. Synthetic dry air (80% $N_2$, 20% $O_2$) was used as received as purge gas, and high purity Ar was used as protection gas during the DSC experiments.

X-ray photoelectron spectroscopy (XPS) spectra were collected on thin films (e.g., 2-5 μm) on a Thermo K-Alpha XPS system with a spot size of 400 μm and a resolution of 0.1 eV.

High-resolution transmission electron microscopy (HR-TEM) was performed on an aberration-corrected FEI Titan S 8-300 TEM/STEM equipped with a Gatan Image Filter Quantum-865 operated at 300 kV. Electron energy loss spectroscopy (EELS) analysis was carried out in STEM mode using a 5 mm aperture with a spectrometer collection angle of 40 mrad and a dispersion of 0.3 eV/channel. Specimen were prepared by spraying 50-80 nm thick films onto a MEMS-based heating chip (Protochips). A Protochips Aduro heating holder was used for all in situ heating experiments. Specimen were heated at a rate of 10° C./min. The electron beam was carefully tuned to minimize any electron-beam-induced damage to the films.

The Li-ion conductivity of the sprayed thin films was measured with in-plane geometry by electrochemical impedance spectroscopy (Biologic). Platinum (Pt) blocking electrodes with a length of 6 mm and a separation distance of 0.25 mm were deposited onto the composite film by sputtering with a stainless-steel shadow mask. The measurement was conducted with Au-coated tungsten tips contacting the Au blocking electrodes. Linkam HFS-600E was used as a temperature- and atmosphere-controlled stage for measurements with a thermocouple placed directly on the membrane surface to rectify the temperature profile. When measuring, the AC amplitude of 100 mV was applied with frequencies scanning between 1 MHz and 0.1 Hz. For each film, the impedance spectrum was acquired every 50° C. from 100 to 350° C. with 2 minutes stabilization time to ensure measurement accuracy. The set temperatures were converted to real temperature through a pre-measured temperature calibration curve. Specifically, set temperatures of 100° C., 150° C., 200° C., 250° C., 300° C., and 350° C. were converted to 78° C., 113° C., 151° C., 188° C., 225° C., and 263° C. in real measurement temperature. All impedance measurements were done under a constant flow of dry synthetic air. The collected data were analyzed with ZView 3.4F.

Results

Example 1: Li Nitrate ($LiNO_3$) as Li Salt

Figure 3:
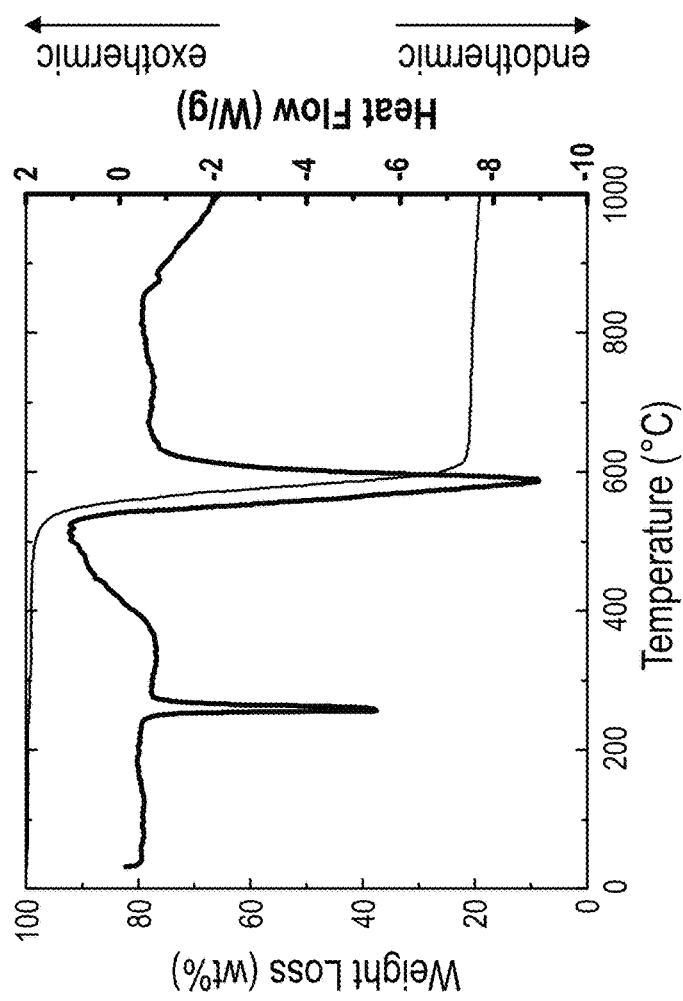
FIG. 3 is a graph of weight loss (weight percent, wt %) and heat flow (watts per gram, W/g) versus temperature and shows the results of thermogravimetric analysis (TGA) and differential scanning calorimetry (DSC) of $LiNO_3$ from room temperature to 1000° C. at a ramp rate of 10° C./minute, under synthetic air.

The thermal stability of the $LiNO_3$ was evaluated by DSC and TGA. In FIG. 3, a significant endothermic peak was observed at 250° C. corresponding to the melting of $LiNO_3$. Decomposition begins when the temperature was further increased to 550° C. and was identified from the endothermic DSC peak near 580° C. and a significant weight loss (80%) from TGA. The results indicate the thermal stability window of $LiNO_3$ up to 250° C. (in solid phase).

Figure 4:
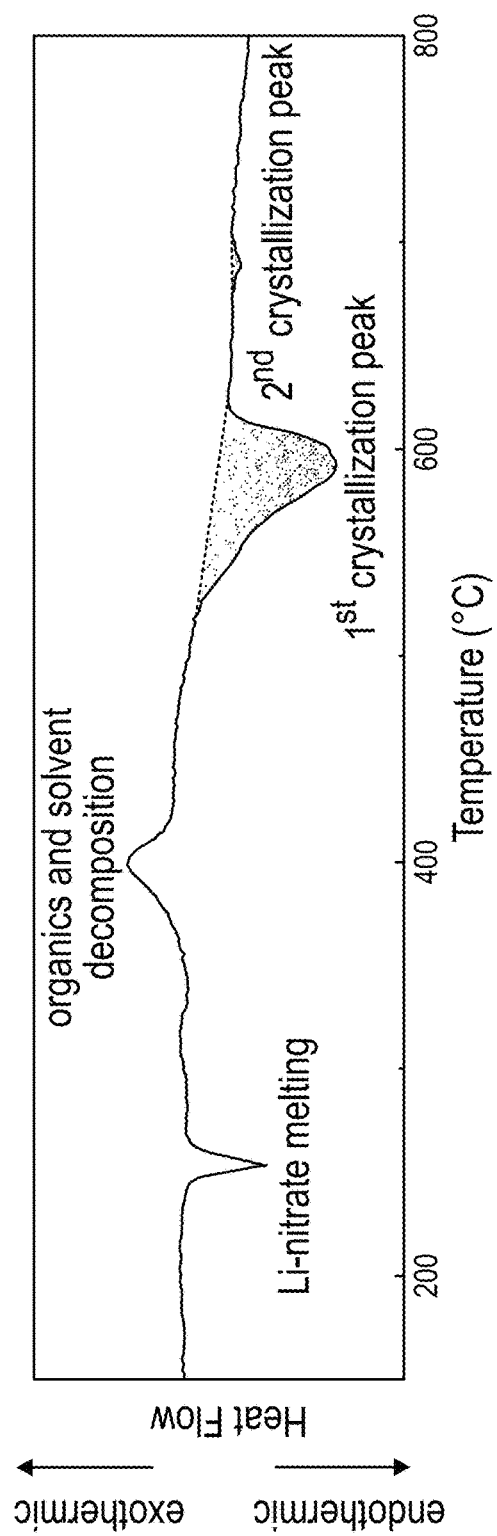
FIG. 4 is a graph of heat flow (arbitrary units, a.u.) versus temperature (° C.) and shows the results of differential scanning calorimetry (DSC) analysis of an as-deposited film from room temperature to 800° C. at a ramp rate of 10° C./minute, under synthetic air.

The multi-phase electrolyte film was deposited by spray pyrolysis on an MgO substrate. To understand the stability and phase transformation and decomposition of $LiNO_3$ salt in the as-deposited film, the film was scratched off from the MgO substrate and transferred to a MgO crucible for DSC evaluation. Similar to the DSC result of $LiNO_3$ precursor in FIG. 3, FIG. 4 shows an endothermic DSC peak at 250° C., corresponding to the melting of $LiNO_3$ salt in the composite film.

Figure 5:
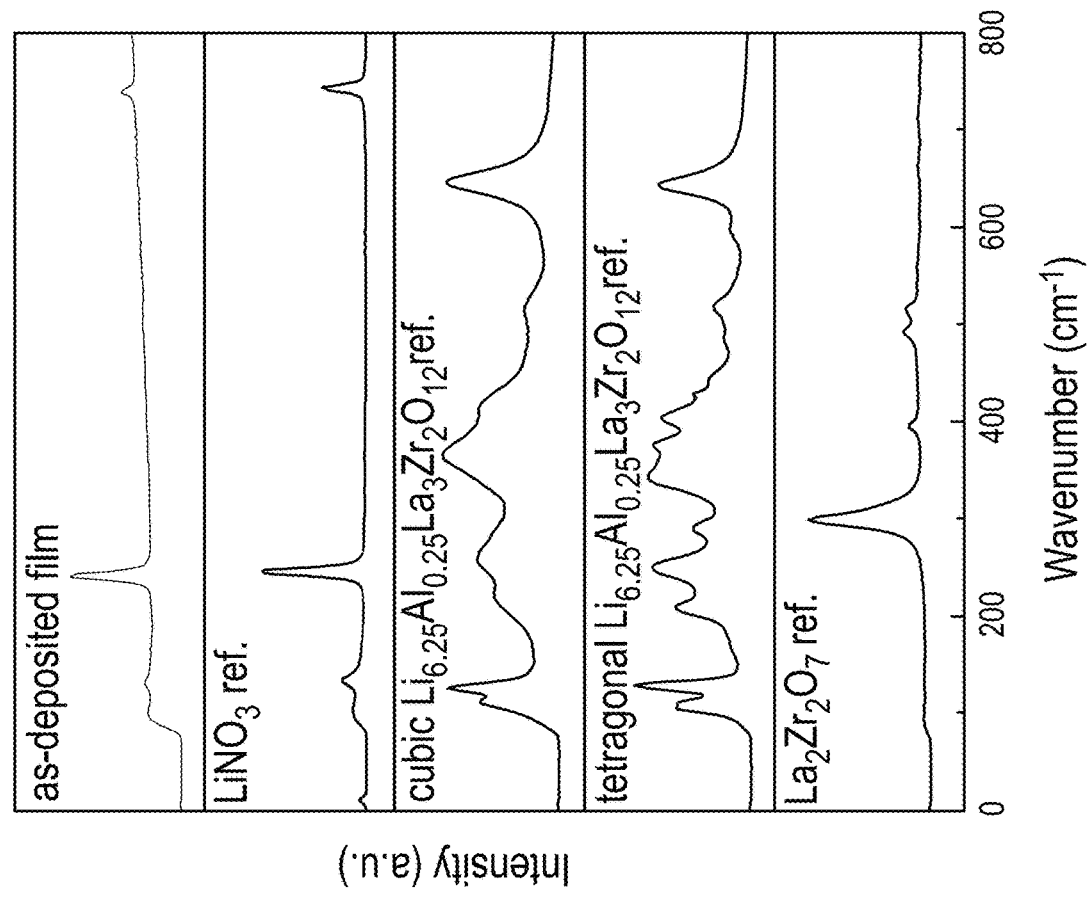
FIG. 5 is a graph of intensity (a.u.) versus wavenumber ($cm^{-1}$) and shows Raman spectra of an as-deposited film, cubic and a tetragonal phase Al-doped Li-garnet reference ($Li_{6.25}Al_{0.25}La_3Zr_2O_{12}$), and a $La_2Zr_2O_7$ reference, where no crystalline phase is observed in the as-deposited film.

FIG. 5 shows the Raman spectrum of the multi-phase film deposited by spray pyrolysis at 300° C. Comparing to the reference spectra of materials with similar chemical composition, no major peak appears in the spectrum of the composite film, indicating the presence of $LiNO_3$ salt and the amorphous nature of the oxide phase of the film.

Figure 6:
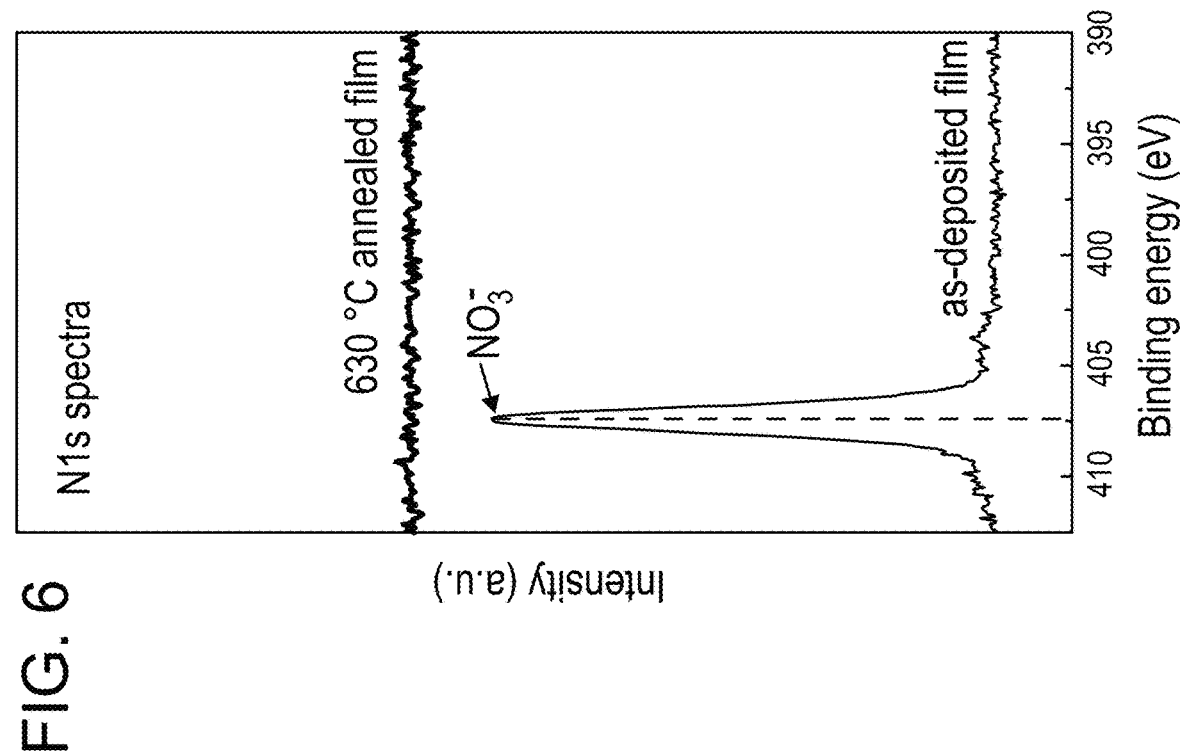
FIG. 6 is as graph of intensity (a.u.) versus binding energy (electron volts, eV) and shows the results of X-ray photoelectron spectroscopy (XPS) analysis of the Nis region for an as-deposited film (sprayed at 300° C.) and a film annealed at 630° C. The peak of the as-deposited film at 407.5 electronvolts (eV) corresponds to the $N_{1s}$ binding energy of $NO_3^-$.

FIG. 6 indicates that nitrogen is still present in sprayed films after depositing the spray solution with a surface temperature of 300° C., confirming that the Li precursor ($LiNO_3$) did not decompose during spray pyrolysis and existed as the nitrate salt in the multi-phase film.

Phase separation and the multi-phase structure of the as-deposited film was studied through HR-TEM (FIGS. 7A to 7E). The circular regions are identified as Li salts, which are embedded within amorphous La, Zr, Al-oxides. Isothermally holding at 275° C. in TEM leads to the onset of melting and infiltration of Li nitrate into the film. This is presented as a kinetically favorable process at 275° C., occurring in as little as several seconds. The melting process was also confirmed by the DSC results in FIG. 3 and FIG. 4.

FIG. 8 shows the Arrhenius plot of the as-deposited film. The Li-ion conductivity of the multi-phase film was obtained through electrochemical impedance measurements at different temperatures. The conductivity of the composite film measured at 78° C., 188° C., and 263° C. were 7.11× $10^{-4}$ S/cm, 2.01×$10^{-2}$ S/cm, and 1.2×$10^{-2}$ S/cm, respectively. A significant increase in conduction was observed when the temperature increased to 263° C. due to the melting of $LiNO_3$ salt in the film. Room temperature (e.g., 30° C.) conductivity of 2.85×$10^{-4}$ S/cm was estimated by extrapolating the data points measured below 250° C., where Li salt stays in the solid phase. The calculated activation energy of Li ion transport is 0.182 eV, which is significantly smaller than the activation energy of most Li oxide ceramic films (e.g., 0.34 eV for sprayed Li-garnet film (e.g., $Li_{6.25}Al_{0.25}La_3Zr_2O_{12}$)). The small activation energy indicates less of an energy barrier for Li ion hopping from one site to another, which can be advantageous for applications of solid electrolytes at ambient temperature.

Example 2: Li Azide ($LiN_3$) as Li Salt

Figure 9:
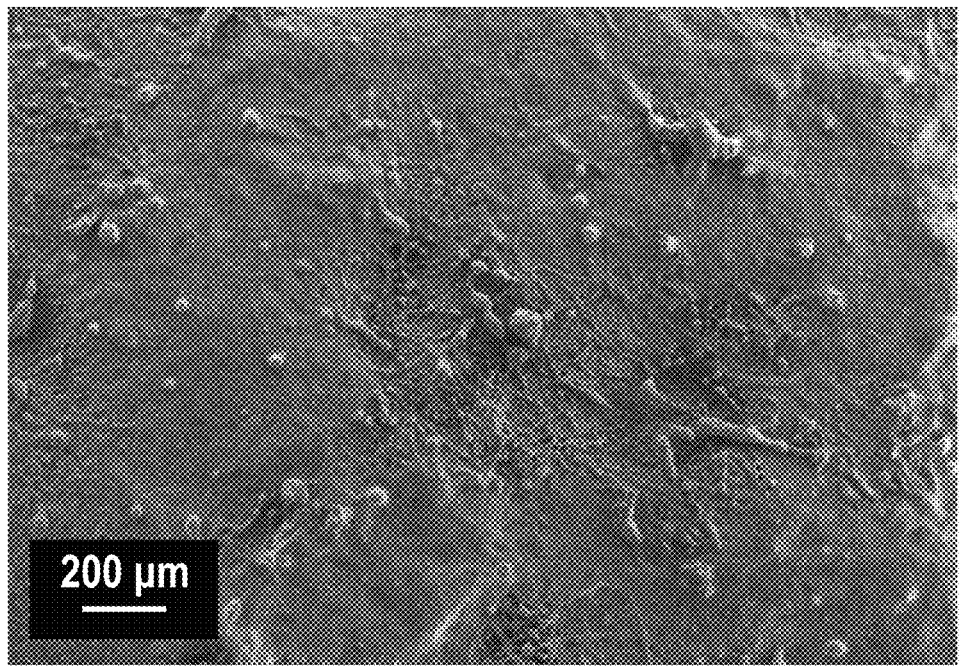
FIG. 9 shows a scanning electron microscopy (SEM) micrograph of the surface of an as-deposited film with $LiN_3$ salt precursor on porous glass fiber substrate.

A multi-phase film structure can also be obtained with different Li salts and precursor chemistry through the same one-step spray pyrolysis deposition method described above. Different substrates can also be used based on processing needs. For example, FIG. 9 shows the surface microstructure of a composite Li-conducting film deposited via one-step spray pyrolysis with Li-azide ($LiN_3$) as the Li precursor (e.g., source). The film shows a crack-free and dense microstructure with complete surface coverage on the porous substrate.

Figure 10:
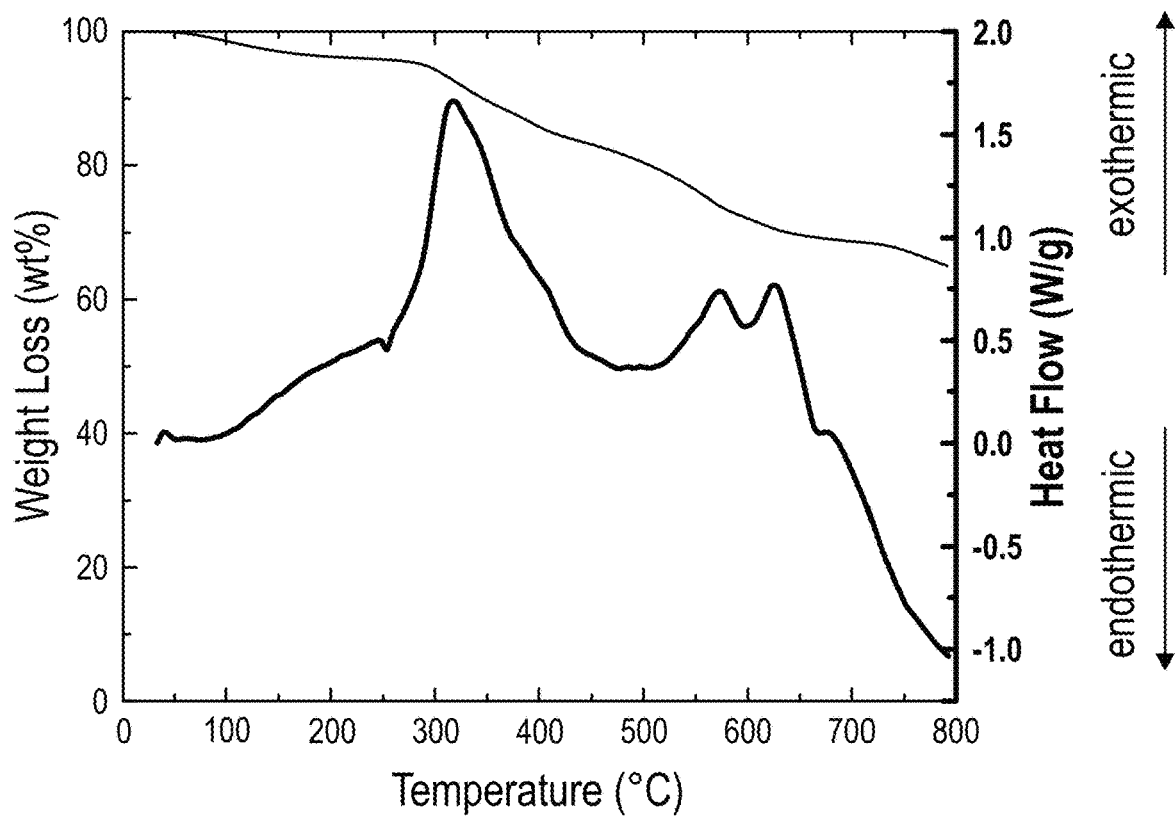
FIG. 10 is a graph of weight loss (weight percent, wt %) and heat flow (watts per gram, W/g) versus temperature and shows the results of DSC and TGA analysis of a $LiN_3$ precursor from room temperature to 800° C. at a ramp rate of 10° C./minute, under synthetic air.

The thermal stability of the LiN$_3$ was evaluated by DSC and TGA, as shown in FIG. 10. A significant exothermic DSC peak along with a weight loss appears at the deposition temperature of 300° C., indicating the on-going decomposition of Li azide (LiN$_3$) to Li nitride (Li$_3$N). Thus, the as-deposited composite film is composed of partially decomposed Li azide (e.g., in the form of lithium nitride, Li$_3$N) and amorphous La, Zr, Al-oxides.

In summary, one-step spray pyrolysis was used to deposit multi-phase Li-conducting electrolyte films. The new film structure can be achieved at a low temperature (e.g., 300° C.) without additional high-temperature annealing or sintering steps. The examples provided herein demonstrate various Li precursor salts can achieve a similar composite film structure despite different precursor chemistry. Overall, an opportunity for manufacturing highly conductive multi-phase solid electrolytes at low-temperature and reduced processing, e.g., manufacture in a single step is provided herein.

The present disclosure includes the following aspects, which are non-limiting.

Aspect 1: A multi-phase electrolyte film comprising: a first phase comprising a metal oxide, wherein the metal oxide is amorphous, crystalline, or a glass; and a second phase comprising a lithium salt having a decomposition temperature in air of greater than 200° C. or a lithium halide; wherein the second phase is dispersed in the first phase and has an average particle size of 5 to 200 nanometers.

Aspect 2: The multi-phase electrolyte film of aspect 1, wherein the film is disposed on a solid substrate.

Aspect 3: The multi-phase electrolyte film of aspect 1 or 2, wherein the lithium salt is LiNO$_3$, Li$_2$SO$_4$, Li$_3$PO$_4$, LiF, LiCl, LiBr, LiOH, LiClO$_4$, Li$_3$N, or a combination thereof.

Aspect 4: The multi-phase electrolyte film of any of aspects 1 to 3, wherein the second phase further comprises LiN$_3$.

Aspect 5: The multi-phase electrolyte film of any of aspects 1 to 4, wherein the metal oxide is amorphous.

Aspect 6: The multi-phase electrolyte film of any of aspects 1 to 5, wherein the metal oxide comprises one or more of La, Zr, Hf, Si, Ti, Ca, Mg, Y, Ta, Al, Ce, Ta, Ga, Nd, or Dy.

Aspect 7: The multi-phase electrolyte film of any of aspects 1 to 6, wherein the metal oxide comprises one or more of La, Zr, Ta, or Al.

Aspect 8: The multi-phase electrolyte film of any of aspects 1 to 7, wherein the metal oxide is an amorphous oxide of La, Zr, and Al.

Aspect 9: The multi-phase electrolyte film of aspect 1 wherein the first phase comprises an amorphous metal oxide of La, Zr, and Al; and the second phase comprises LiNO$_3$ or Li$_3$N having an average crystallite size of 20 to 100 nm.

Aspect 10: The multi-phase electrolyte film of any of aspects 1 to 9, wherein the film has a lithium conductivity of greater than 0.1 mS/cm at 30° C.

Aspect 11: The multi-phase electrolyte film of aspect 1, wherein the first phase comprises an amorphous metal oxide of La, Zr, and Al; the second phase comprises LiNO$_3$ or Li$_3$N having an average crystallite size of 20 to 100 nm; and the multi-phase electrolyte film has a lithium conductivity of greater than 0.1 to 0.5 mS/cm at 30° C.

Aspect 12: The multi-phase electrolyte film of any of aspects 1 to 11, wherein the film has a thickness of 1 to 50 micrometers.

Aspect 13: The multi-phase electrolyte film of any of aspects 1 to 12, wherein the multi-phase electrolyte film is a dual-phase electrolyte film consisting of the first phase and the second phase.

Aspect 14: The multi-phase electrolyte film of any of aspects 1 to 12, further comprising a third phase comprising a lithium salt that is different from the lithium salt of the second phase, a lithium oxide, or both.

Aspect 15: A method for producing a multi-phase electrolyte film, the method comprising: providing a mixture comprising a lithium source, and one or more metal oxide precursors; spraying the mixture onto a solid substrate at a temperature of 150 to 500° C. to provide the multi-phase electrolyte film comprising a first phase comprising a metal oxide, wherein the oxide is amorphous, crystalline, or a glass, and a second phase comprising a lithium salt having a decomposition temperature in air of greater than 200° C. or a lithium halide, wherein the second phase is dispersed in the first phase and has an average particle size of 5 to 200 nanometers.

Aspect 16: A method for producing a multi-phase electrolyte film, the method comprising: providing a first precursor mixture comprising one or more metal oxide precursors and a first solvent; providing a second precursor mixture comprising a lithium source and a second solvent; spraying the first precursor mixture and the second precursor mixture onto a solid substrate at a temperature of 150 to 500° C. to provide the multi-phase electrolyte film comprising a first phase comprising a metal oxide, wherein the oxide is amorphous, crystalline, or a glass, and a second phase comprising a lithium salt having a decomposition temperature in air of greater than 200° C. or a lithium halide, wherein the second phase is dispersed in the first phase and has an average particle size of 5 to 200 nanometers.

Aspect 17: The method of aspect 15 or 16, wherein the lithium source is one or more of LiNO$_3$, LiN$_3$, Li$_2$SO$_4$, Li$_3$PO$_4$, LiF, LiCl, LiBr, LiOH, or LiClO$_4$.

Aspect 18: The method of any of aspects 15 to 17, wherein the oxide precursor comprises a nitrate or acetate of one or more of La, Zr, Hf, Si, Ti, Ca, Mg, Y, Ta, Al, Ce, Ta, Ga, Nd, or Dy.

Aspect 19: The method of any of aspects 15 to 18, wherein the solid substrate is porous.

Aspect 20: The method of any of aspects 15 to 19, wherein the solid substrate comprises a borosilicate, carbon, a polyimide, a metal, a metal alloy, or a metal oxide.

Aspect 21: An electrochemical cell comprising: a positive electrode; a negative electrode; and an electrolyte layer between the positive electrode and the negative electrode, wherein at least one of the positive electrode, the negative electrode, or the electrolyte layer comprises the multi-phase electrolyte film of any of aspects 1 to 14.

Various aspects are shown in the accompanying drawings. This invention may, however, be embodied in many different forms, and should not be construed as limited to the aspects set forth herein. Rather, these aspects are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third," etc. may be used herein to describe various elements, components, regions, layers, or sections, these elements, components, regions, layers, or sections should not be limited by these terms. These terms are only used to distinguish one element, component, region, layer, or section from another element, component, region, layer or section. Thus, "a first element," "component," "region," "layer," or "section" discussed below could be termed a second element, component, region, layer or section without departing from the teachings herein.

The terminology used herein is for the purpose of describing particular aspects only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." It will be further understood that the terms "comprises" and/or "comprising," or "includes" or "including" when used in this specification, specify the presence of stated features, regions, integers, steps, operations, elements, or components, but do not preclude the presence or addition of one or more other features, regions, integers, steps, operations, elements, components, or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary aspects are described herein with reference to cross section illustrations that are schematic illustrations of idealized aspects. As such, variations from the shapes of the illustrations as a result, for example, of manufacturing techniques and/or tolerances, are to be expected. Thus, aspect described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

While a particular aspect has been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A method for producing a multi-phase electrolyte film, the method comprising:
   providing a mixture comprising
      a lithium source, and
      one or more metal oxide precursors comprising a nitrate or acetate of one or more of La, Zr, Hf, Si, Ti, Ca, Mg, Y, Ta, Al, Ce, Ta, Ga, Nd, or Dy;
   spraying the mixture onto a solid substrate at a temperature of 150 to 500° C. to provide the multi-phase electrolyte film comprising
   a first phase comprising a metal oxide, wherein the oxide is amorphous, crystalline, or a glass, and
   a second phase comprising a lithium salt having a decomposition temperature in air of greater than 200° C. or a lithium halide,
   wherein the second phase is dispersed in the first phase and has an average particle size of 5 to 200 nanometers.

2. The method of claim 1, wherein the lithium source is one or more of $LiNO_3$, $LiN_3$, $Li_2SO_4$, $Li_3PO_4$, LiF, LiCl, LiBr, LiOH, or $LiClO_4$.

3. The method of claim 1, wherein the solid substrate comprises a borosilicate, carbon, a polyimide, a metal, a metal alloy, or a metal oxide.

4. A method for producing a multi-phase electrolyte film, the method comprising:
   providing a first precursor mixture comprising one or more metal oxide precursors and a first solvent, wherein the one or more metal oxide precursors comprises a nitrate or acetate of one or more of La, Zr, Hf, Si, Ti, Ca, Mg, Y, Ta, Al, Ce, Ta, Ga, Nd, or Dy;
   providing a second precursor mixture comprising a lithium source and a second solvent;
   spraying the first precursor mixture and the second precursor mixture onto a solid substrate at a temperature of 150 to 500° C. to provide the multi-phase electrolyte film comprising
   a first phase comprising a metal oxide, wherein the oxide is amorphous, crystalline, or a glass, and
   a second phase comprising a lithium salt having a decomposition temperature in air of greater than 200° C. or a lithium halide,
   wherein the second phase is dispersed in the first phase and has an average particle size of 5 to 200 nanometers.

5. The method of claim 4, wherein the lithium source is one or more of $LiNO_3$, $LiN_3$, $Li_2SO_4$, $Li_3PO_4$, LiF, LiCl, LiBr, LiOH, or $LiClO_4$.

6. The method of claim 4, wherein the solid substrate comprises a borosilicate, carbon, a polyimide, a metal, a metal alloy, or a metal oxide.

* * * * *